US012604192B2

(12) United States Patent
Singh et al.

(10) Patent No.: US 12,604,192 B2
(45) Date of Patent: Apr. 14, 2026

(54) FRAUD PREVENTION LEVERAGING WEBHOOKS TO OBTAIN THIRD PARTY FRAUD DATA IDENTIFICATION

(71) Applicant: Bank of America Corporation, Charlotte, NC (US)

(72) Inventors: Shailendra Singh, Maharashtra (IN); Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 319 days.

(21) Appl. No.: 18/438,626

(22) Filed: Feb. 12, 2024

(65) Prior Publication Data

US 2025/0260986 A1 Aug. 14, 2025

(51) Int. Cl.
| | |
|---|---|
| *H04W 12/12* | (2021.01) |
| *G06F 40/40* | (2020.01) |
| *H04W 12/60* | (2021.01) |
| *H04W 12/67* | (2021.01) |

(52) U.S. Cl.
CPC ............ *H04W 12/12* (2013.01); *G06F 40/40* (2020.01); *H04W 12/66* (2021.01); *H04W 12/67* (2021.01)

(58) Field of Classification Search
None
See application file for complete search history.

(56) References Cited

U.S. PATENT DOCUMENTS

| | | | | |
|---|---|---|---|---|
| 11,741,478 | B1 * | 8/2023 | Dixon | H04M 1/66 |
| | | | | 705/4 |
| 12,525,224 | B2 * | 1/2026 | Altaf | G10L 15/08 |
| 2019/0109878 | A1 * | 4/2019 | Boyadjiev | G06F 21/50 |
| 2019/0130490 | A1 * | 5/2019 | Durkee | G06Q 40/08 |
| 2021/0203779 | A1 * | 7/2021 | Piscopo, Jr | H04M 3/436 |
| 2022/0279014 | A1 * | 9/2022 | Stokes, III | G06N 3/08 |
| 2023/0208875 | A1 * | 6/2023 | Do | H04L 63/1425 |
| | | | | 726/22 |
| 2024/0195904 | A1 * | 6/2024 | Min | H04M 1/654 |

* cited by examiner

*Primary Examiner* — San Htun
(74) *Attorney, Agent, or Firm* — Weiss & Arons LLP

(57) ABSTRACT

A method for using a fraud detection application running on a mobile device to monitor, in real-time, a telephonic communication on the mobile device. Data may be continuously extracted from the telephonic communication by the fraud detection application. The method may include determining from the extracted data, that the data includes a fraud indicator. In response to the determining, a webhook may be generated that includes a payload storing metadata of the telephonic communication. The method may include identifying a group of mobile devices that may be associated with the data and further transmitting the webhook to each of the group of mobile devices and an entity server supporting the fraud detection application. The method may include receiving a rating of the telephonic communication from at least some of the mobile devices and from an entity server and using the ratings to determine a threshold level of fraud.

20 Claims, 6 Drawing Sheets

Mobile App
Proposed by this tech

206

Customer

204

Fake
Caller

202

Live call
extract
fetched

Live call extract

208

Live call extract

Comparison
with previous
call extract

Live call
extract

211

Previous
extract

212

212

Polling on the fly

218

216

Identifies
fraud and
trust score

214

Live rating of the call shown to customer

220

| NO | LOW | MEDIUM | NORMAL | HIGH | MAX |

FRAUD PREVENTION LEVERAGING WEBHOOKS TO OBTAIN THIRD PARTY FRAUD DATA IDENTIFICATION

FIELD OF TECHNOLOGY

Aspects of the disclosure relate to monitoring telephonic communications for fraudulent activity. Aspects of the disclosure relate to monitoring telephone calls for possible fraud and using webhooks to obtain analytic insights for use in analyzing the possible fraud.

BACKGROUND OF THE DISCLOSURE

Fraudulent telephone calls have become common in recent times. In addition, electronically impersonating individuals and/or businesses has become widespread. Widespread availability of customer information provides a wealth of information via the internet and more specifically via social media platforms. The availability of customer information on the internet may provide fraudsters with the information to target unsuspecting customers.

It would be desirable, therefore, to provide systems and methods for monitoring telephonic communications to proactively identify the possibility of fraud.

It would be further desirable to obtain input from other devices to determine whether or not a call may originate from a fraudulent source.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
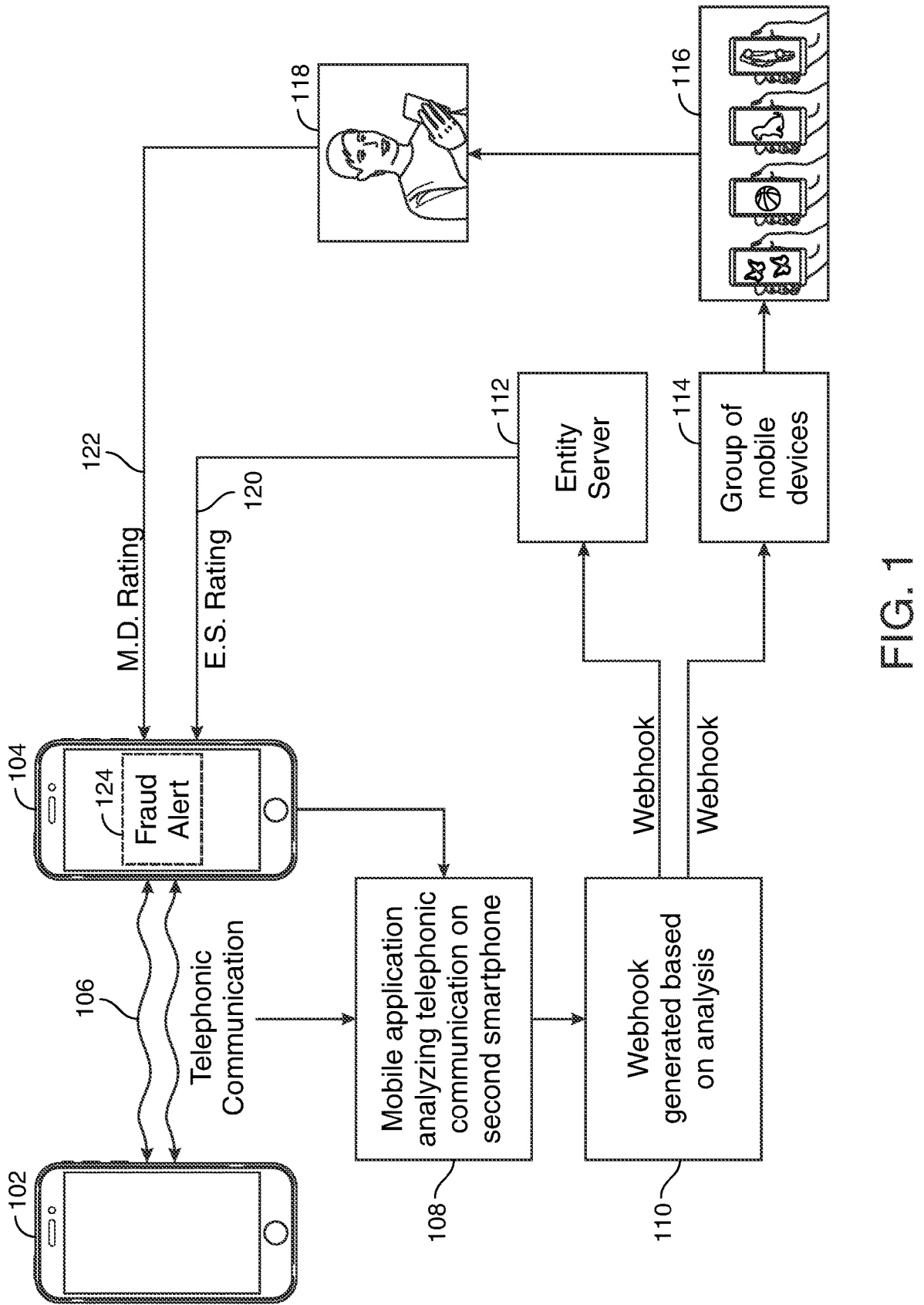
FIG. 1 shows an illustrative flow diagram in accordance with principles of the disclosure.

A method for using an application running on a second mobile device to monitor, in real-time, a telephonic communication on the second mobile device is provided. The monitoring may be performed to identify and detect any identification of fraudulent activity occurring during the telephonic communication.

The method may include continuously extracting data from the telephonic communication. The data may be extracted using machine learning ("ML") algorithms, i.e.—natural language processing ("NLP").

Based on the extracted data, the method may include identifying, from the data, an intent and a plurality of keywords. Each word extracted from the telephonic communication may be processed and determined whether it may be tagged as an intent, keyword, description or not important for the determining.

The extracted data may be compared to data from previous calls. The extracted data may be compared to words that may have been previously identified as an indication of fraud.

The method may include determining, based on the intent and the plurality of keywords, that the data comprises a fraud indicator. A fraud indicator may be an unrecognized phone number, difference in language and/or specific predetermined keywords that may be indicators of fraud, i.e.—private data, or any other suitable known fraudulent indicators.

In response to the determining, the method may include generating a webhook. A webhook may enable lightweight, event-driven communication between two application programming interfaces ("APIs"). The webhook may include a payload. The payload may store metadata of the telephonic communication.

In some embodiments the method may include prior to generating the webhook, comparing the identification of the caller and the data to previously received telephonic communications received at the second mobile device. When a threshold level of similarity is identified between one or more previously received telephonic communications and the telephonic communication, the method may include storing an identifying of the threshold level of similarity within the metadata in the webhook.

The metadata may include an identification of a caller of the telephonic communication from the first mobile device. The metadata may also include the intent and the plurality of keywords. The metadata may further include an encrypted dataset for receipt by an entity server. It should be appreciated that the encrypted dataset may be deciphered by the entity server.

The entity server may be a platform for providing a mobile application. The mobile application may be run on each mobile device included in a network of mobile devices.

The encrypted dataset may include a time of receipt of the call. The encrypted dataset may include user data associated with a user of the second mobile device. The user data may include customer information associated with the user within the entity.

The metadata may also include an input field for receiving a rating. The input field may be a selectable option wherein upon receipt of the webhook at each of the mobile devices, the user may select a selectable option or input data in the input field.

The method may include searching the network of mobile devices to identify a group of mobile devices. Each of the mobile devices in the group may run the mobile application. The mobile application run on each of the mobile devices may be associated with at least one of the plurality of keywords. The entity server may store data relating to each of the mobile applications. The data may include one or more keywords associated with each mobile application.

The network of mobile devices may be mobile devices that may have previously opted-in to subscribe to the option of receiving webhooks to assist in minimizing fraudulent activity. These mobile devices may also have the fraud detection application running on their respective mobile devices.

The method may include transmitting the webhook to each of the mobile devices in the group of mobile devices. The method may also include transmitting the webhook to an entity server supporting the application.

The method may include receiving a mobile device rating from at least some of the mobile devices included in the group of mobile devices. It should be appreciated that upon receipt of the webhook at a mobile device, the user of the mobile device may be alerted to the webhook via a pop-up notification, email, text-message or any other suitable communication mode. The user may select the notification and based on the metadata included in the webhook, determine whether there is an indication of fraud involved in the telephonic communication. The webhook may include the input field. The user may rate the telephonic communication via the input field.

In some embodiments the network of mobile devices may be mobile devices located within the same geolocation as a geolocation of the second mobile device.

In some embodiments, the network of mobile devices may be mobile devices that are pre-selected by a user of the second mobile device. In some embodiments, pre-selection may include a user selecting one or more phone numbers stored in the user's mobile device for inclusion in the group of mobile devices.

In some embodiments, pre-selection may be a selection, executed by a user of the second mobile device, indicating that the user has one or more vulnerabilities, such as advanced age, hearing disability, special needs, etc. In some of these embodiments, the pre-selection may be used to filter the network of mobile devices to select, from the network, the group of mobile devices, at least some of which are associated with the vulnerability.

In some embodiments, the group of mobile devices may be mobile devices of a group of employees that may be employed by the entity for monitoring telephonic communications. Upon receipt of the webhook at the mobile devices of this selected group of employees, the mobile devices may leverage machine learning ("ML") and AI programs executed by the entity and running on the mobile devices for determining whether there is an indication of fraud in the telephonic communication.

The method may also include receiving an entity server rating from the entity server. The entity server rating may be based on entity accessible data and/or historical fraudulent calls stored at the entity server in comparison to the metadata.

In some embodiments, following a receipt of the webhook by the entity server, the entity server may be configured to use ML for inputting the second rating. The second rating may be determined by comparing the time of the receipt of the call to an average time for receipt of calls. The second rating may also be determined by comparing the metadata to metadata associated with the historical fraudulent calls.

When the time of the receipt of the call is outside a pre-determined range of time for receiving calls, the entity server rating may be greater than the predetermined threshold level.

The predetermined threshold level of fraud may be met when a predetermined amount of fraud indicators have been identified. The predetermined amount of fraud indicators may be one, two, three, four, five or any other suitable amount.

When the entity server rating is below a predetermined threshold level of fraud the method may include using the mobile device rating and the entity server rating to determine a threshold level of fraud.

In response to the level of fraud being greater than the predetermined threshold level of fraud, the method may include transmitting a fraud alert notification to the second mobile device.

When the entity server rating is above the predetermined threshold level, the method may include disregarding the mobile device rating and automatically terminating the telephonic communication at the second mobile device.

In some embodiments, prior to terminating the call, the caller at the first mobile device may be muted in the event that the caller of the second mobile device may share private and confidential information before termination of the call.

The method may further include, following the transmitting of the webhook, continuing to extract data from the telephonic communication. When the data includes a fraud indicator, the method may include generating an additional webhook for transmitting to each of the mobile devices in the group of mobile devices.

A system for monitoring, in real-time, a telephonic communication on the second mobile device using a fraud detection application running on the second mobile device is provided.

The system may include a fraud detection application configured to monitor the telephonic communication occurring at the second mobile device. The telephonic communication may be initiated by a first mobile device.

The fraud detection application may be configured to continuously extract data from the telephonic communication during the duration of the telephonic communication.

The fraud detection application may be configured to identify from the data, an intent and a plurality of keywords. The fraud detection application may be further configured to determine, based on the intent and the plurality of keywords, that the data comprises a fraud indicator.

In response to the determining, the fraud detection application may be configured to generate a webhook. The webhook may include a payload. The payload may store metadata of the telephonic communication. The metadata may include an identification of a caller of the telephonic communication from the first mobile device. The metadata may also include the intent and the plurality of keywords. The metadata may also include an encrypted dataset for receipt by an entity server. The encrypted dataset may be enabled to be deciphered by the entity server.

The metadata may also include an input field for receiving a rating. The input field may include selectable options.

Following the generating of the webhook, the fraud detection application may be configured to search a network of mobile devices to identify a group of mobile devices. Each of the mobile devices in the group may be associated with at least one of the plurality of keywords. The entity server may use the extracted data to determine whether data from the telephonic communication may correspond to one or more mobile devices in the network of mobile devices. The entity server may store data relating to each of the mobile applications and search the data to identify mobile device(s) that include data that may correspond to the one or more keywords.

For example, when the telephonic communication is associated with mortgage application, the entity server may select mobile devices where the customer profile of the user of the mobile device includes data associated with mortgages.

In response to the identifying of the group of mobile devices, the fraud detection application may be configured to transmit the webhook to each of the mobile devices in the group of mobile devices and to an entity server supporting the fraud detection application.

Each mobile device within the group of mobile devices may be configured to receive the webhook.

Each mobile device may be configured to extract the metadata from the webhook and display the metadata on a user interface ("UI") of the mobile device. Based on the extracted metadata, input of a mobile device rating may be inputted into the input field.

The rating may be selected from selectable options included in the input field. The selectable options may be displayed on the mobile device as a selection of scores ranging from zero to 10. The selectable options may be displayed on the mobile device as a selection of colors ranging from green to red, where green is selected when the user does not detect fraud in the telephonic communication and red is selected when the user detects fraud in the telephonic communication.

In some embodiments, a user of each mobile device may select a rating. In some embodiments, a selection of users may input a rating.

Each mobile device may be configured to transfer the mobile device rating to the fraud detection application.

The entity server may be configured to receive the webhook. The entity server may be further configured to extract the metadata from the webhook including the encrypted dataset.

The entity server may be configured to execute a fraud detection machine ML algorithm to determine fraudulent activity. In response to the determining, the entity server may be configured to transmit an entity server rating to the fraud detection application.

The fraud detection application may be configured to receive the mobile device rating from at least one or more of the group of mobile devices. The fraud detection application may be configured to receive the entity server rating from the entity server.

When the entity server rating is below a predetermined threshold level of fraud, the fraud detection application may be configured to use the first rating and the second rating to determine a threshold level of fraud. In response to the level of fraud being greater than the predetermined threshold level of fraud, the fraud detection application may be configured to transmit a fraud alert notification to the second mobile device. The fraud alert notification may be displayed as a pop-up on a user interface of the second mobile device. The fraud alert notification may be received as one or more of a text-message, email and voice prompt from the fraud detection application.

When the entity server rating is above the predetermined threshold level, the fraud detection application may be configured to disregard the first rating and automatically terminate the telephonic communication at the second mobile device.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative diagram of a telephonic communication being monitored via a fraud detection mobile application in accordance with principles of the disclosure.

Fraud detection mobile application 108 may be an application downloaded from entity server 112 and running on mobile device 104. Fraud detection mobile application 108 may be configured for extracting data from telephonic communications received at mobile device 104.

A user of mobile device 102 may attempt to electronically connect via telephonic communication to one or more mobile devices in an attempt to retrieve personal identification data from users of the mobile devices.

Fraud detection mobile application 108 may be triggered to begin extracting data upon receipt of telephonic communication 106 at mobile device 104. It should be appreciated that as long as there is an active telephonic communication between mobile device 102 and mobile device 104, the fraud detection mobile application 108 may be monitoring the telephonic communication.

Fraud detection mobile application 108 may extract data from the conversation. Fraud detection mobile application 108 may use ML algorithms for extracting the data. ML algorithms may enable identifying the intent and one or more keywords associated with the telephonic communication 106.

Fraud detection mobile application 108 may be running on mobile device 104 and may be simultaneously in electronic communication and connection with entity server 112.

When fraud detection mobile application 108 detects fraud in the telephonic communication, application 108 may be triggered to generate a webhook for transmitting to one or more locations. The webhook may include metadata associated with the telephonic communication. The webhook, at 110, may be transmitted to both entity server 112 and a group of mobile devices 114. In some embodiments, the webhook 110 may only be transmitted to entity server 112. In some embodiments, the webhook 110 may be transmitted only to the group of mobile devices 114.

When a webhook is received at each of the mobile devices within the group of mobile devices, as shown at 116, the webhook may be displayed as a popup and/or notification on the user's mobile device. Each user may instantly tap on the webhook and rate the telephonic communication based on the data received in the webhook. In some embodiments, a rating may be received from each mobile device. In some embodiments, a rating may be received from at least some of the mobile devices.

Each mobile device rating 122 transmitted from a mobile device 118, from the group of mobile devices at 116, may be received at fraud detection application 108 at mobile device 104.

When webhook 110 is received at entity server 112, the entity server may execute one or more ML algorithms for identifying fraud in the telephonic communication based on the data received in the webhook. Entity server 112 may rate the telephonic communication as shown at 120 and transmit the rating to fraud alert application 108 running on mobile device 104.

Based on each rating received, a fraud alert notification 124 may be displayed to the user on mobile device 104.

It should be appreciated that each telephonic communication, the extracted data and the ratings received may be stored at the entity server. This data may be used as training data in forthcoming telephonic communications.

Figure 2:
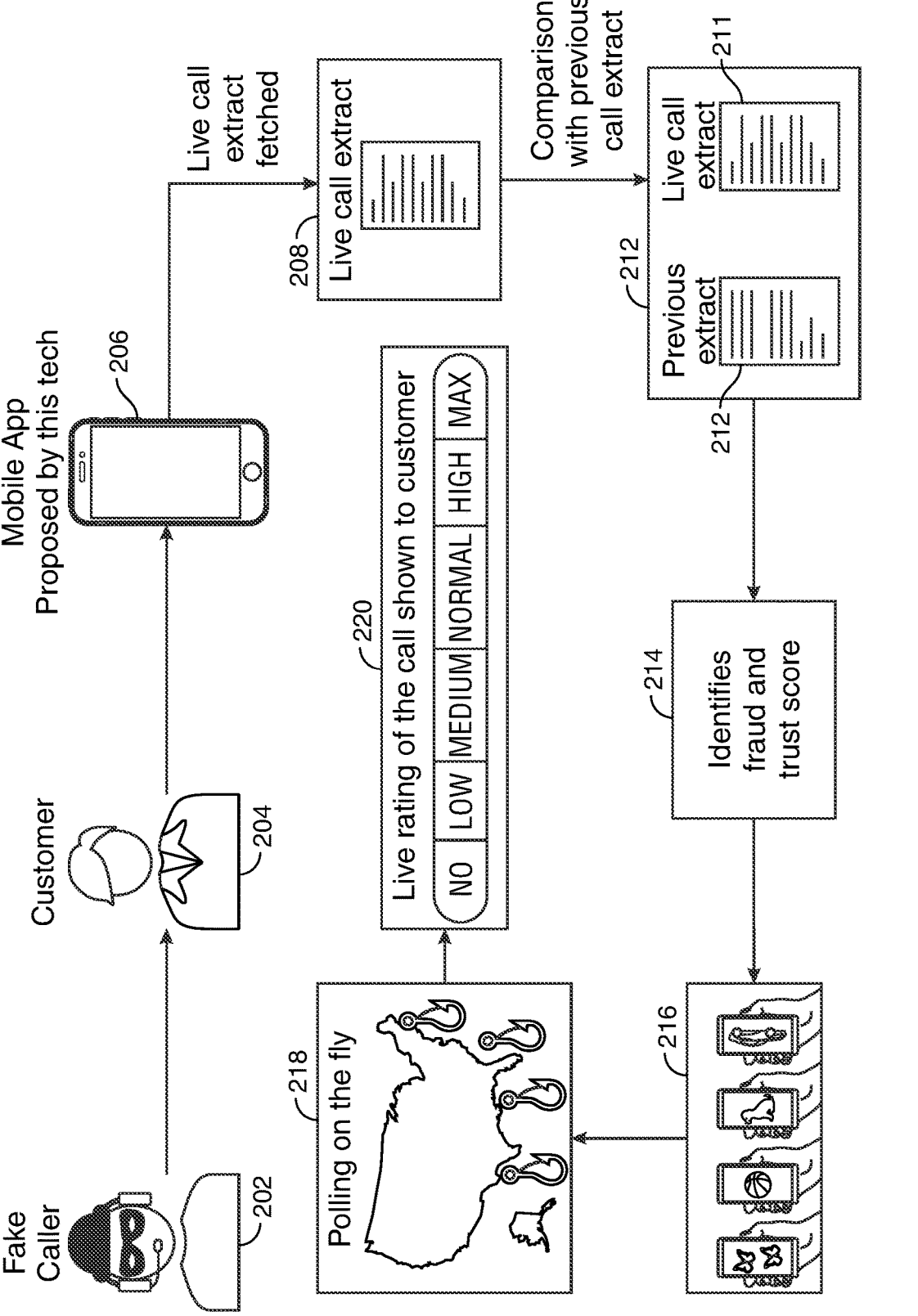
FIG. 2 shows an illustrative flow diagram in accordance with principles of the disclosure.

FIG. 2 shows an illustrative flow diagram in accordance with principles of the disclosure. In this exemplary diagram, caller 202 may be a fake caller. Caller 202 may attempt to reach out to a customer 204 of an entity. Caller 202 may perform as an employee of the entity in order to retrieve personal data from customer 204.

Mobile device 206 may be the mobile device of customer 204. Mobile device 206 may include a fraud detection application running on mobile device 206. Fraud detection application may be a mobile application retrieved from an entity server associated with the entity of the customer 204. Fraud detection application may be in electronic communication with the entity server Fraud detection application may extract data from the telephonic communication between caller 202 and customer 204. Live call extract 208 may be compared to files extracted from previous calls that were identified to be fraudulent, as shown at 211 and 212.

Based on the comparison, fraud detection application may detect fraud and assign a score, as shown at 214. The score and the identification of fraud may be included in the metadata transmitted via a webhook to a group of mobile devices 216. The group of mobile devices 216 may be a group within the same geo-location. The group of mobile devices 216 may be mobile devices within different geo-locations 218 but may all be subscribers of the fraud detection application alerts.

Following receipt of the webhook at the group of mobile devices, a rating of the telephonic communication may be received from each mobile device. The rating may be displayed to the customer on a rating bar as shown at 220. The rating bar may continuously adjust during the duration of the telephonic communication based on each incoming rating from each mobile device.

Figure 3:
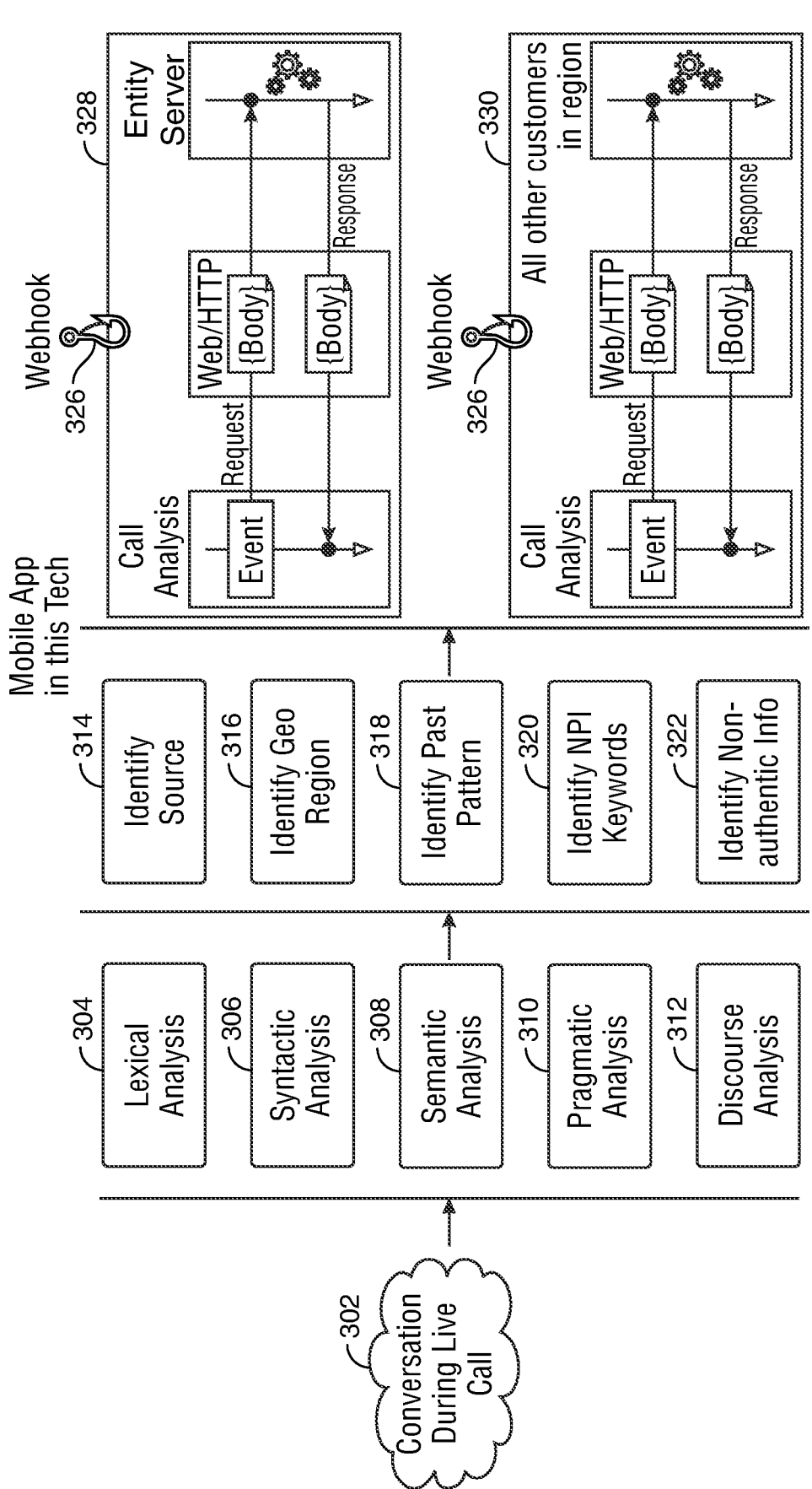
FIG. 3 shows an illustrative flow diagram in accordance with principles of the disclosure.

FIG. 3 shows an illustrative diagram of the analysis of the telephonic communication in accordance with principles of the disclosure.

Telephonic communication 302 may be analyzed in real-time, during the duration of the call. The analysis may be performed by one or more algorithms stored and executed at the fraud detection mobile application on the user's mobile device.

The one or more algorithms may use NLP to decipher the intent and implication of the telephonic communication. Fraud detection application may use lexical analysis 304, syntactic analysis 306, semantic analysis 308, pragmatic analysis 310 and discourse analysis 312 to extract intent and meaning of the telephonic communication.

Based on the analysis 304-312, details of the telephonic communication may be extracted. This may include identifying a source of the call as shown at 314. Additionally, the analysis may enable identifying a geo-region 316. The geo-region may enable identifying where the call originated. The analysis may further identify past patterns 318. Past patterns 318 may include comparing past patterns to similar calls previously received. Based on the analysis, non-public information ("NPI") keywords 320 may be identified. Additionally, non-authentic information 322 may be identified based on the analysis.

Following the analysis, the fraud detection application may trigger an event. The event may be the indication of fraud in the telephonic communication. When an event is triggered, a webhook 326 may be generated in response to the trigger. Webhook 326 may include the event and metadata. Webhook 328 may use an HTTP POST request to be transmitted entity server, as shown at 328. Webhook 328 may use an HTTP POST request to be transmitted to a group of mobile devices, as shown at 330.

Webhook 328 may include metadata associated with the telephonic communication 302. The metadata may include data extracted based on analysis 304-312.

Figure 4:
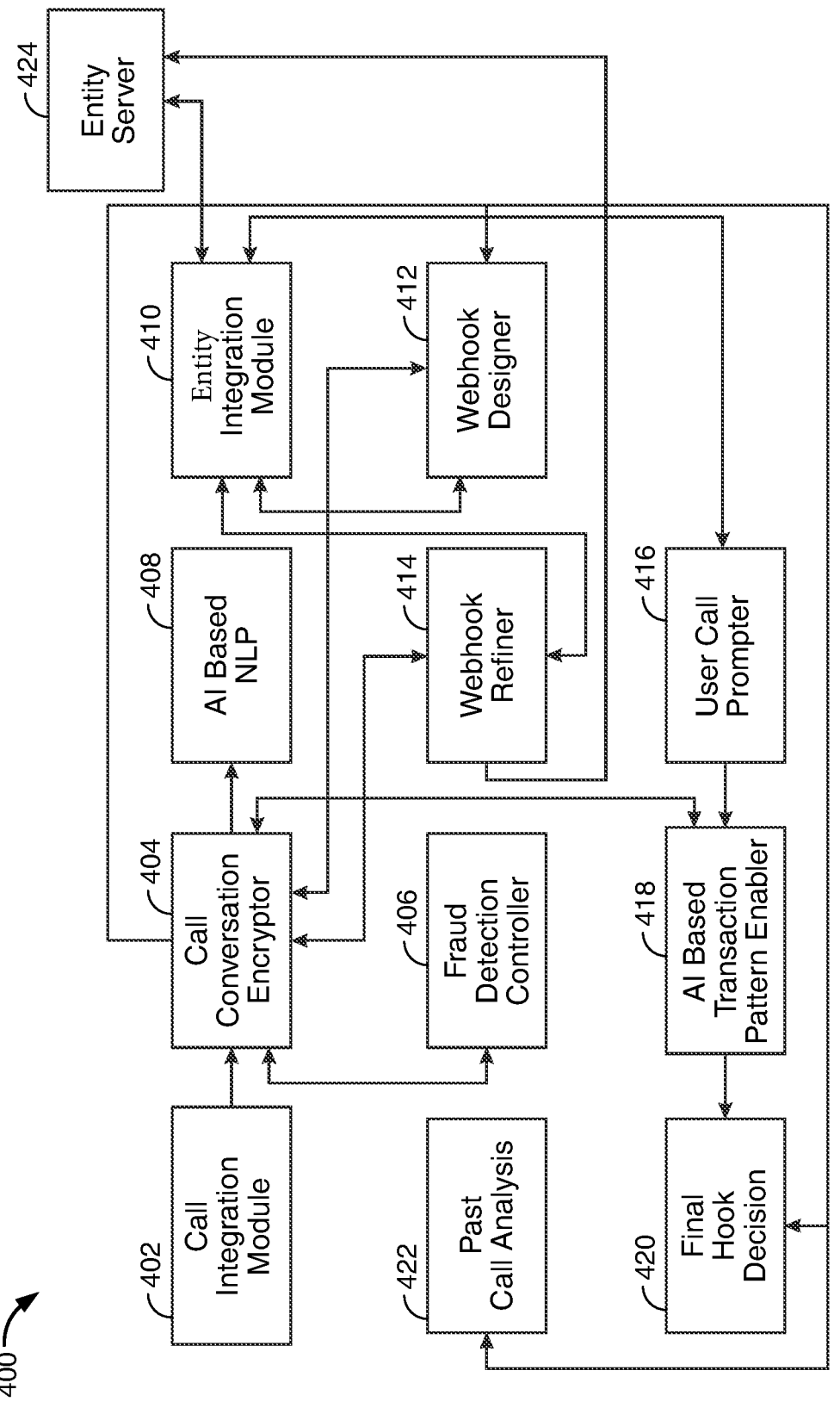
FIG. 4 shows an illustrative flow diagram in accordance with principles of the disclosure.

FIG. 4 shows apparatus and methods 400 for detecting fraud in telephonic communications.

Diagram 400 includes a call integration module 402. Call integration module 402 may trigger execution of the fraud detection application as soon as the telephonic communication is received at the mobile device. Call conversation encryptor 404 may encrypt the telephonic communication at the mobile device it is received in order to maintain privacy.

Fraud detection controller 406 may be an application that may extract data from previous calls and compare it to the data being analyzed to detect fraud. AI based NLP module 408 may be configured for finalizing a decision for sending out a webhook.

Fraud detection application may include a webhook refiner 414. Webhook refiner 414 may continuously refine the decisioning of the level of fraud that may be indicative in the telephonic communication based on the ratings received at the fraud detection application. Webhook refiner 414 may refine the status of the live polls received in real-time.

Final hook decision 420 may be the final decision displayed on the mobile device. Final hook decision may be further based on past call analysis 422.

AI based transaction pattern enabler 418 may be an application used to detect past transaction patterns, analyze the patterns, compare the patterns to the current telephonic communication analysis and feed the results to final hook decision 420.

User call prompter 416 may be an application that may enable prompting the caller via popup or text, robot call or voice prompt during the duration of the call for notification of a fraud alert.

Webhook designer 412 may enable customizing the webhook based on understanding of the context of the telephonic communication, identified keywords and further matching users of mobile devices to the identified keywords.

Entity server integration module 410 may be a module that integrates the entity server 424 with the mobile device hosting the fraud detection application. Entity server integration module 410 may transmit alerts and notifications from entity server 424 to the mobile device based on analysis of the telephonic communication.

Figure 5:
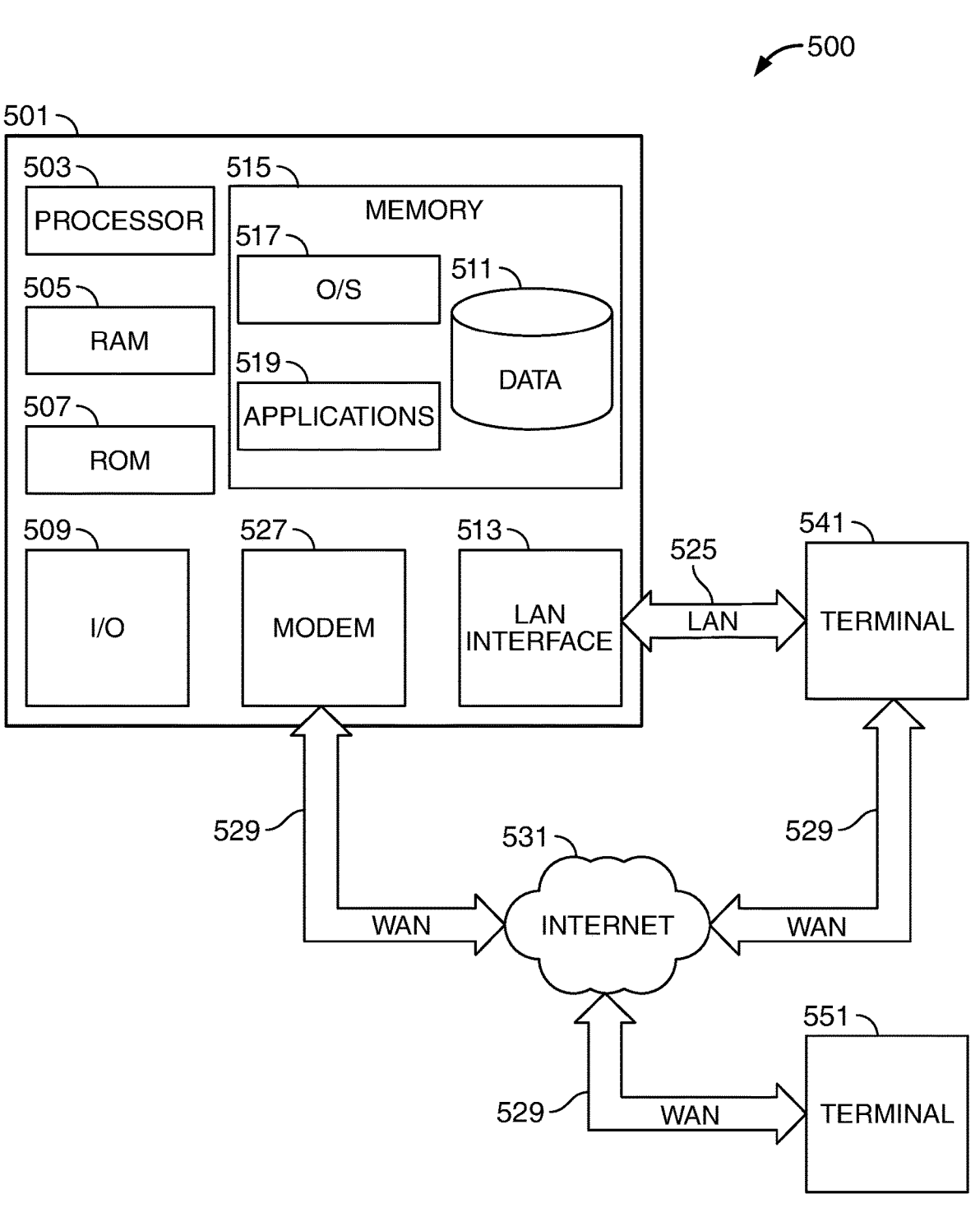
FIG. 5 shows an illustrative block diagram in accordance with principles of the disclosure.

FIG. 5 shows an illustrative block diagram of system 500 that includes computer 501. Computer 501 may alternatively be referred to herein as an "engine," "server" or a "computing device." The computing system may include one or more computer servers 501. Computer 501 may be any computing device described herein. Computer 501 may include mobile device 102, mobile device 104, entity server 112 and any other computing device described herein. Computer 501 may include the communications server. Elements of system 500, including computer 501, may be used to implement various aspects of the systems and methods disclosed herein.

Computer 501 may have a processor 503 for controlling the operation of the device and its associated components, and may include RAM 505, ROM 507, input/output circuit 509, and a non-transitory or non-volatile memory 515. Machine-readable memory may be configured to store information in machine-readable data structures. Other components commonly used for computers, such as EEPROM or Flash memory or any other suitable components, may also be part of the computer 501.

The memory 515 may be comprised of any suitable permanent storage technology—e.g., a hard drive. The memory 515 may store software including the operating system 517 and application(s) 519 along with any data 311 needed for the operation of computer 501. Memory 515 may also store videos, text, and/or audio assistance files. The data stored in Memory 515 may also be stored in cache memory, or any other suitable memory.

Input/output ("I/O") module 309 may include connectivity to a microphone, keyboard, touch screen, mouse, and/or stylus through which input may be provided into computer 501. The input may include input relating to cursor movement. The input/output module may also include one or more speakers for providing audio output and a video display device for providing textual, audio, audiovisual, and/or graphical output. The input and output may be related to computer application functionality.

Computer 501 may be connected to other systems via a local area network (LAN) interface 513. Computer 501 may operate in a networked environment supporting connections to one or more remote computers, such as terminals 541 and 551. Terminals 541 and 551 may be personal computers or servers that include many or all of the elements described above relative to computer 501.

When used in a LAN networking environment, computer 501 is connected to LAN 525 through a LAN interface 513 or an adapter. When used in a WAN networking environment, computer 501 may include an environment 527 or other means for establishing communications over WAN 529, such as Internet 531.

In some embodiments, computer 501 may be connected to one or more other systems via a short-range communication network (not shown). In these embodiments, computer 501 may communicate with one or more other terminals 541 and 551, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 519, which may be used by computer 501, may include computer executable instructions for invoking functionality related to communication, such as e-mail, Short Message Service (SMS), and voice input and speech recognition applications. Application program(s) 519 (which may be alternatively referred to herein as "plugins," "applications," or "apps") may include computer executable instructions for invoking functionality related to performing various tasks. Application programs 519 may utilize one or more algorithms that process received executable instructions, perform power management routines or other suitable tasks. Application programs 519 may include any one or more of the applications embedded within fraud detection application 108, and instructions and algorithms associated with and/or embedded within the fraud detection application 108.

Application program(s) 519 may include computer executable instructions (alternatively referred to as "programs"). The computer executable instructions may be embodied in hardware or firmware (not shown). The computer 501 may execute the instructions embodied by the application program(s) 519 to perform various functions.

Application program(s) 519 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 519 may include one or more algorithms that may be used to implement features of the disclosure. Applications 519 may include fraud detection application embedded in mobile device 104, each application and module described in FIG. 4, applications included in webhook 110, application(s) embedded in each of the mobile devices within the network of mobile devices, and any other applications described herein.

The invention may be described in the context of computer-executable instructions, such as applications 519, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 501 and/or terminals 541 and 551 may also include various other components, such as a battery, speaker, and/or antennas (not shown). Components of computer system 501 may be linked by a system bus, wirelessly or by other suitable interconnections. Components of computer system 501 may be present on one or more circuit boards. In some embodiments, the components may be integrated into a single chip. The chip may be silicon-based.

Terminal 551 and/or terminal 541 may be portable devices such as a laptop, cell phone, Blackberry™, tablet, smartphone, or any other computing system for receiving, storing, transmitting and/or displaying relevant information. Terminal 351 and/or terminal 541 may be one or more user devices. Terminals 551 and 541 may be identical to computer 501 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloudbased systems, programmable consumer electronics, network PCs, minicomputers, mainframe computers, distributed computing environments that include any of the above systems or devices, and the like.

Figure 6:
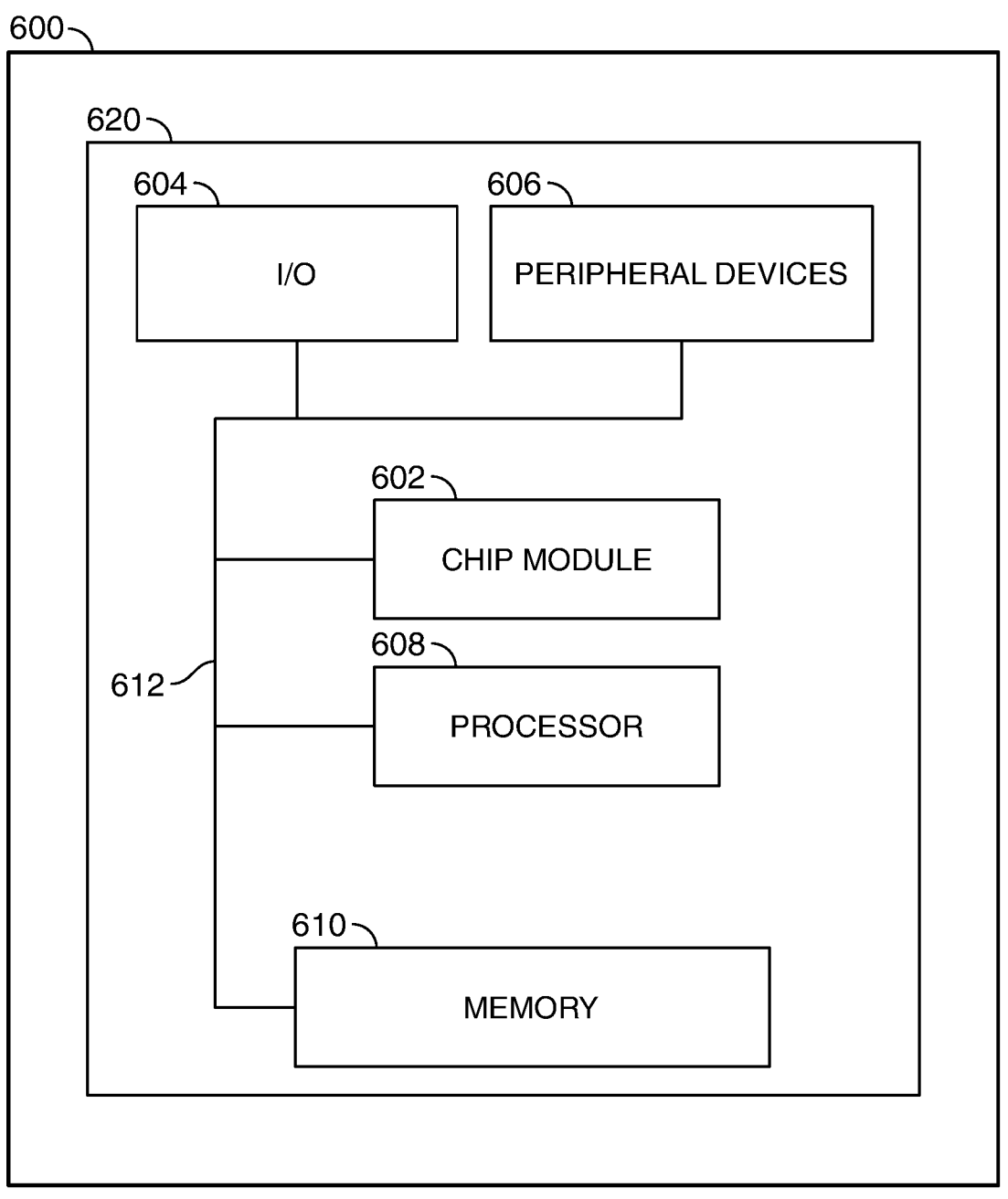
FIG. 6 shows an illustrative apparatus that may be configured in accordance with principles of the disclosure.

FIG. 6 shows illustrative apparatus 600 that may be configured in accordance with the principles of the disclosure. Apparatus 600 may be a computing device. Apparatus 600 may include chip module 602, which may include one or more integrated circuits, and which may include logic configured to perform any other suitable logical operations.

Apparatus 600 may include one or more of the following components: I/O circuitry 604, which may include a transmitter device and a receiver device and may interface with fiber optic cable, coaxial cable, telephone lines, wireless devices, PHY layer hardware, a keypad/display control device or any other suitable media or devices; peripheral devices 606, which may include counter timers, real-time timers, power-on reset generators or any other suitable peripheral devices; logical processing device 608, which may compute data structural information and structural parameters of the data, and machine-readable memory 610.

Machine-readable memory 610 may be configured to store in machine-readable data structures: machine executable instructions, (which may be alternatively referred to herein as "computer instructions" or "computer code"), applications such as applications 619, signals, and/or any other suitable information or data structures.

Components 602, 604, 606, 608 and 610 may be coupled together by a system bus or other interconnections 612 and may be present on one or more circuit boards such as circuit board 620. In some embodiments, the components may be integrated into a single chip. The chip may be silicon-based.

Thus, systems and methods for using a fraud detection application running on a mobile device to monitor, in real-time, a telephonic communication on the mobile device is provided. Persons skilled in the art will appreciate that the present invention can be practiced by other than the described embodiments, which are presented for purposes of illustration rather than of limitation.

What is claimed is:

1. A method for using a fraud detection application running on a second mobile device to monitor, in real-time, a telephonic communication on the second mobile device, the method comprising:

using natural language processing to continuously extract data from the telephonic communication;

identifying, from the data, an intent and a plurality of keywords;

determining, based on the intent and the plurality of keywords, that the data comprises a fraud indicator;

in response to the determining, generating a webhook that includes a payload, the payload storing metadata of the telephonic communication, the metadata comprising:

an identification of a caller of the telephonic communication from a first mobile device, the telephonic communication initiated by the first mobile device;

the intent and the plurality of keywords;

an encrypted dataset for receipt by an entity server, the encrypted dataset enabled to be deciphered by the entity server; and an input field for receiving a rating;

searching a network of mobile devices to identify a group of mobile devices, each of the group of mobile devices being associated with at least one of the plurality of keywords;

transmitting the webhook to each of the group of mobile devices and the entity server supporting the fraud detection application;

receiving, a mobile device rating from at least some of the mobile devices included in the group of mobile devices;

receiving an entity server rating from the entity server, the entity server rating being based on entity accessible data, historical fraudulent calls stored at the entity server in comparison to the metadata, the entity server rating a level of fraud in the telephonic communication;

when the entity server rating is below a predetermined threshold level of fraud:

using the mobile device rating and the entity server rating to determine a threshold level of fraud; and in response to the level of fraud being greater than the predetermined threshold level of fraud, transmitting a fraud alert notification to the second mobile device; and when the entity server rating is above the predetermined threshold level, disregarding the mobile device rating and automatically terminating the telephonic communication at the second mobile device.

2. The method of claim 1 wherein the telephonic communication is determined to comprise the fraud indicator when at least one of the intent and the plurality of keywords link to a request associated with private data.

3. The method of claim 1 wherein the fraud indicator is the intent and the plurality of keywords.

4. The method of claim 1 wherein the encrypted dataset comprises a time of receipt of the telephonic communication and user data associated with a user of the second mobile device.

5. The method of claim 4 wherein, following a receipt of the webhook by the entity server, the entity server is configured to use machine learning ("ML") for inputting the entity server rating, the entity server rating determined by:

comparing the time of the receipt of the call to an average time for receipt of calls; and comparing the metadata to metadata associated with the historical fraudulent calls.

6. The method of claim 5 wherein when the time of the receipt of the call is outside a pre-determined range of time for receiving calls, the entity server rating is greater than the predetermined threshold level.

7. The method of claim 1 wherein the entity server is in electronic communication with the fraud detection application and when the fraud indicator is identified, the method comprises, prior to generating the webhook, comparing the identification of the caller and the data to previously received telephonic communications received at the second mobile device.

8. The method of claim 1 wherein the network of mobile devices are mobile devices located within a pre-determined proximity to a geolocation of the second mobile device.

9. The method of claim 1 wherein the network of mobile devices are mobile devices pre-selected by a user of the second mobile device.

10. The method of claim 1 further comprising, following the transmitting of the webhook, continuing to extract data from the telephonic communication and when the data comprises a fraud indicator, generating an additional webhook for transmitting to each of the mobile devices in the group of mobile devices.

11. A system for monitoring, in real-time, a telephonic communication on a second mobile device using a fraud detection application running on the second mobile device, the system comprising:

the fraud detection application configured to monitor the telephonic communication occurring at the second mobile device, the telephonic communication initiated by a first mobile device by:

continuously extracting data from the telephonic communication;

identifying, from the data, an intent and a plurality of keywords;

determining, based on the intent and the plurality of keywords, that the data comprises a fraud indicator;

in response to the determining, generating a webhook that includes a payload, the payload storing metadata of the telephonic communication, the metadata comprising:

an identification of a caller of the telephonic communication from the first mobile device;

the intent and the plurality of keywords;

an encrypted dataset for receipt by an entity server, the encrypted dataset enabled to be deciphered by the entity server; and an input field for receiving a rating;

searching a network of mobile devices to identify a group of mobile devices, each of the mobile devices in the group associated with at least one of the plurality of keywords; and transmitting the webhook to each of the mobile devices in the group of mobile devices and to the entity server supporting the fraud detection application;

each mobile device within the group of mobile devices configured to:

receive the webhook;

extract the metadata from the webhook and display the metadata on a user interface ("UI") of the mobile device;

input a mobile device rating within the input field; and transfer the mobile device rating to the fraud detection application;

the entity server configured to:

receive the webhook;

extract the metadata from the webhook including the encrypted dataset;

execute a fraud detection machine learning ("ML") algorithm to determine fraudulent activity; and in response to the determining, transmit an entity server rating to the fraud detection application; and the fraud detection application configured to:

receive the mobile device rating from at least one or more of the group of mobile devices;

receive the entity server rating from the entity server;

when the entity server rating is below a predetermined threshold level of fraud:

using the mobile device rating and the entity server rating to determine a threshold level of fraud; and in response to a level of fraud being greater than the predetermined threshold level of fraud, transmit a fraud alert notification to the second mobile device; and when the entity server rating is above the predetermined threshold level, disregard the mobile device rating and automatically terminate the telephonic communication at the second mobile device.

12. The system of claim 11 wherein the fraud alert notification is displayed as a pop-up on a user interface of the second mobile device.

13. The system of claim 11 wherein the fraud alert notification is received as one or more of a text-message, email and voice prompt from the fraud detection application.

14. The system of claim 11 wherein the network of mobile devices are mobile devices located within a pre-determined proximity to a geolocation of the second mobile device.

15. The system of claim 11 wherein the network of mobile devices are mobile devices pre-selected by a user of the second mobile device.

16. A method for using a fraud detection application running on a second mobile device to monitor, in real-time, a telephonic communication on the second mobile device, the method comprising:

using natural language processing to continuously extract data from the telephonic communication;

identifying, from the data, an intent and a plurality of keywords;

determining, from at least one of the intent and the plurality of keywords, that the data comprises a fraud indicator;

in response to the determining, generating a webhook that includes a payload, the payload storing metadata of the telephonic communication, the metadata comprising:

an identification of a caller of the telephonic communication from a first mobile device, the telephonic communication initiated by the first mobile device;

the intent and the plurality of keywords;

an encrypted dataset for receipt by an entity server, the encrypted dataset enabled to be deciphered by the entity server; and an input field for receiving a rating;

searching a network of mobile devices to identify a group of mobile devices, each of the mobile devices in the group associated with at least one of the plurality of keywords;

transmitting the webhook to each of the mobile devices in the group of mobile devices and the entity server supporting the fraud detection application;

receiving, a mobile device rating from at least some of the mobile devices included in the group of mobile devices;

receiving an entity server rating from the entity server, the entity server rating being based on entity accessible data, historical fraudulent calls stored at the entity server;

when the entity server rating is below a predetermined threshold level of fraud:

using the mobile device rating and the entity server rating to determine a threshold level of fraud; and in response to the level of fraud being greater than the predetermined threshold level of fraud, transmitting a fraud alert notification to the second mobile device; and when the entity server rating is above the predetermined threshold level, disregarding the mobile device rating and automatically terminating the telephonic communication at the second mobile device.

17. The method of claim 16 wherein, following a receipt of the webhook by the entity server, the entity server is configured to use machine learning ("ML") for inputting the entity server rating, the entity server rating determined by:

comparing a time of the receipt of the telephonic communication to an average time for receipt of telephonic communications; and comparing the metadata to metadata associated with the historical fraudulent calls.

18. The method of claim 17 wherein when the time of the receipt of the call is outside a pre-determined range of time for receiving calls, the entity server rating is greater than the predetermined threshold level.

19. The method of claim 16 wherein the fraud alert notification is received as one or more of a text-message, email and voice prompt from the fraud detection application.

20. The method of claim 16 wherein the network of mobile devices are mobile devices located within a pre-determined proximity to a geolocation of the second mobile device.

\* \* \* \* \*